United States Patent
Jackson et al.

(10) Patent No.: US 7,152,775 B2
(45) Date of Patent: Dec. 26, 2006

(54) MAGNETIC SOURCE AND FERROMAGNETIC DEVICE FOR ULTRASONIC WELDING

(75) Inventors: Eugene A. Jackson, Renton, WA (US); Mark F. Gabriel, Renton, WA (US)

(73) Assignee: The Boeing Company, Chicago, IL (US)

( * ) Notice: Subject to any disclaimer, the term of this patent is extended or adjusted under 35 U.S.C. 154(b) by 221 days.

(21) Appl. No.: 10/827,077

(22) Filed: Apr. 19, 2004

(65) Prior Publication Data

US 2005/0230455 A1 Oct. 20, 2005

(51) Int. Cl.
B23K 1/06 (2006.01)
B23K 20/10 (2006.01)

(52) U.S. Cl. .................... 228/1.1; 228/110.1

(58) Field of Classification Search .......... 228/1.1, 228/44.3, 110.1, 111; 156/73.1; 72/482.9; 269/8

See application file for complete search history.

(56) References Cited

U.S. PATENT DOCUMENTS

| | | | | |
|---|---|---|---|---|
| 1,452,841 A | * | 4/1923 | Meyer | 72/466.5 |
| 4,478,659 A | * | 10/1984 | Hall | 156/73.1 |
| 5,460,320 A | * | 10/1995 | Belcher et al. | 228/180.22 |
| 5,598,964 A | * | 2/1997 | Gore et al. | 228/1.1 |
| 5,699,950 A | * | 12/1997 | Jang | 228/1.1 |
| 5,749,987 A | * | 5/1998 | Wannebo | 156/64 |
| 6,180,928 B1 | * | 1/2001 | Garrigus | 219/491 |
| 6,607,304 B1 | * | 8/2003 | Lake et al. | 385/57 |
| 6,634,539 B1 | * | 10/2003 | Mlinar et al. | 228/110.1 |

* cited by examiner

*Primary Examiner*—Kevin Kerns
(74) *Attorney, Agent, or Firm*—Alston & Bird LLP

(57) ABSTRACT

There is provided an ultrasonic welding apparatus that includes a magnetic source and a ferromagnetic device to apply pressure to at least one component being joined during the ultrasonic welding process. The magnetic source is positioned proximate the ultrasonic transducer, and when the component to be ultrasonically welded is adjacent the ultrasonic transducer, the ferromagnetic device is positioned opposite the component from the magnetic source and the ultrasonic transducer to apply pressure. A magnetic source comprising an electromagnet provides an adjustable pressure to the component. The ferromagnetic device defines a generally spherical surface so that it advantageously remains in position relative to the magnetic source if the component is moved relative to the ferromagnetic device. In addition, the ferromagnetic device may comprise a magnet to increase the magnetic force between the magnetic source and ferromagnetic device, which increases the pressure applied to the component.

16 Claims, 1 Drawing Sheet

MAGNETIC SOURCE AND FERROMAGNETIC DEVICE FOR ULTRASONIC WELDING

BACKGROUND OF THE INVENTION

1) Field of the Invention

The present invention is related to ultrasonic welding devices, and more particularly, to an apparatus for providing pressure to a component during the ultrasonic welding process.

2) Description of Related Art

Ultrasonic welding apparatuses are commonly used to join one or more components by producing mechanical vibrations that are absorbed by the component and that heat the material of the component to a melting point and/or to a state where an applied pressure allows the component to be joined. For example, plastics are ultrasonically welded by positioning the plastic component adjacent an ultrasonic horn, through which the ultrasonic vibrations produced by an ultrasonic transducer are transmitted. The plastic component absorbs the ultrasonic vibrations, such that the material plasticizes locally. The plasticized material can therefore be joined to other material. Ultrasonic welding is widely used with plastics because it may be performed relatively quickly and usually produces welds that are relatively free of flash. Ultrasonic welding may also be used with other materials such as metals.

During the ultrasonic welding process, pressure is typically applied to the component being welded. Such pressure ensures that one or more components are properly joined during the relatively brief period of time that the material is heated. Therefore, applying pressure to the component is an important aspect of ultrasonic welding. However, when components defining unusual shapes or sizes require ultrasonic welding, providing the proper pressure to the component can be complicated. One example of such a component is a rolled sheet being welded into a tube. One technique for providing the proper amount of pressure is to insert a rigid arm into the interior of the tubular component so that the an applies a pressure on the component proximate the ultrasonic transducer and horn. This technique is often undesirable because of the required amount of fixturing, the difficulty in applying the proper amounts of pressure, the time involved to properly position the an, and/or the inability of an arm to provide adequate amounts of pressure at hard-to-reach locations on die component. Accordingly, a need exists for an apparatus that conveniently provides pressure to a component during ultrasonic welding.

BRIEF SUMMARY OF THE INVENTION

The invention addresses the above needs and achieves other advantages by providing an ultrasonic welding apparatus that includes a magnetic source and an associated ferromagnetic device for applying pressure to the one or more components being joined. By providing a magnetic force between the magnetic source and the ferromagnetic device, which are positioned on opposite sides of the component, the ferromagnetic device applies pressure to the component during the ultrasonic welding process.

According to the present invention, the ultrasonic welding apparatus includes an ultrasonic transducer adjacent the component to be joined to another component or to itself. Advantageously, the ultrasonic transducer may include an ultrasonic horn that engages the component during the joining of the component. The ultrasonic welding apparatus also includes a magnetic source that provides a magnetic field and that is proximate the ultrasonic transducer. Advantageously, the ultrasonic transducer and magnetic source are positioned on a common side of the component. The ultrasonic welding apparatus includes a ferromagnetic device on an opposite side of the component from the ultrasonic transducer and magnetic source, such that the magnetic field provided by the magnetic source supports the ferromagnetic device so that the component is positioned between the ultrasonic transducer and ferromagnetic device.

Advantageously, the magnetic field provided by the magnetic source is adjustable so that changes in the magnetic field will change the amount of compressive force the ferromagnetic device applies to the component. Accordingly, while the magnetic source may comprise one or any number of electromagnets, the magnetic source of one embodiment comprises two electromagnets equally spaced from opposed sides of the ultrasonic transducer to generally align the resulting force applied by the ferromagnetic device with the ultrasonic transducer. The ferromagnetic device advantageously defines a spherical outer surface, such as a steel sphere or a spherical magnet, to enable the ferromagnetic device to remain in a generally fixed position relative to a moving component.

The present invention also provides methods for ultrasonically joining at least one component. In these methods, the component is positioned adjacent the ultrasonic transducer and the magnetic source, such that the ultrasonic transducer and the magnetic source and are on a common side of the component. The ferromagnetic device is provided on an opposite side of the component, and when the magnetic field is provided by the magnetic source, the ferromagnetic device is supported by the magnetic field so that the component is positioned between the ultrasonic transducer and the ferromagnetic device. The ultrasonic transducer concurrently transmits an ultrasonic signal to join the component. The component may be advantageously advanced, relative to the ultrasonic transducer, as the ultrasonic transducer transmits the ultrasonic signal to define a joint along the component.

The present invention, therefore, provides a system and method for conveniently joining at least one component by ultrasonic welding. The magnetic source and ferromagnetic device provide sufficient pressure during the joining process to permit a joint, seam, or the like to be reliably and repeatedly formed. Furthermore, the present invention requires relatively less fixturing and provides more convenient and consistent application of pressure during the joining process than previous techniques.

BRIEF DESCRIPTION OF THE DRAWING

Figure 1:
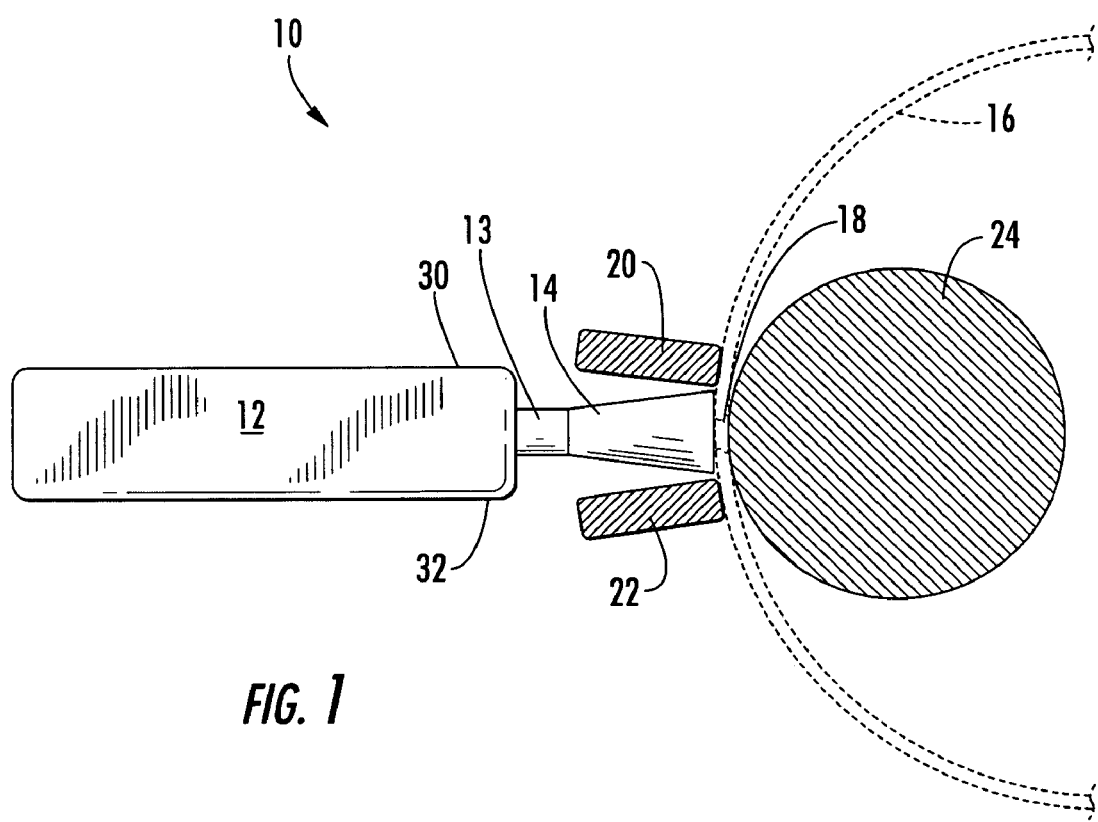

Having thus described the invention in general terms, reference will now be made to the accompanying drawings, which are not necessarily drawn to scale, and wherein:

FIG. 1 is a side elevational view of an ultrasonic welding apparatus according to one embodiment of the present invention, illustrating the ultrasonic transducer and the magnetic source on a common side of the component and the ferromagnetic device on an opposite side of the component.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIG. 1 an ultrasonic welding apparatus in accordance with one embodiment of the present invention is illustrated. The ultrasonic welding apparatus 10 of FIG. 1 is illustrated during the joining process of a single thermoplastic component. Specifically, FIG. 1 illustrates an ultrasonic transducer 12 with a booster 13 and an ultrasonic horn 14 joining a rolled thermoplastic sheet 16, shown in cross-section, into a tubular body by ultrasonically welding opposed edges of the thermoplastic sheet to define a joint 18. This application of the ultrasonic welding apparatus 10 of the present invention is representative only and is not intended to limit the present invention to ultrasonic welding of specific materials, shapes, or the like. The ultrasonic welding apparatus of the present invention is advantageously used to join non-ferromagnetic materials. Additionally, the ultrasonic welding apparatus of the present invention may be used to join one or more components to create any type of joint, such as simple lap, butt scarf lap, wall butt lap, or tongue and groove joints to list non-limiting examples.

The ultrasonic transducer 12 illustrated in FIG. 1 may be the Zonic 20 Universal ultrasonic welder, which is available from Ultrasonic Engineering Ltd. of London, England. The Zonic 20 Universal ultrasonic welder is capable of ultrasonically welding plastics of various dimensions. However, it should be appreciated that the ultrasonic transducer of further embodiments of the present invention may comprise alternative ultrasonic transducers. The ultrasonic transducer 12 of the ultrasonic welding apparatus 10 includes a booster 13 and an ultrasonic horn 14. The ultrasonic transducer 12 converts electrical energy to ultrasonic energy and transmits an ultrasonic signal comprising mechanical vibrations that are used for the joining process. The booster 13 amplifies the mechanical vibrations produced by the ultrasonic transducer and transfers them to the ultrasonic horn 14. The ultrasonic horn 14 transfers the mechanical vibrations to the component being joined. The ultrasonic horn 14 typically engages the component 16 being welded to facilitate the transfer of the mechanical vibrations to the component. Further embodiments of the present invention may include ultrasonic transducers that comprise alternative or additional parts or that transfer the mechanical vibrations by alternative techniques.

To provide the requisite pressure on the component 16 during the joining process, the ultrasonic welding apparatus 10 of the present invention includes a magnetic source that provides a magnetic field that attracts a ferromagnetic device toward the magnetic source and thus provides the requisite pressure to the component. For the ultrasonic welding apparatus of FIG. 1, the magnetic source comprises a first electromagnet 20 and a second electromagnet 22 that provide a magnet field to attract the ferromagnetic device 24. The magnetic source is proximate the ultrasonic transducer 12, such that it is on a common side of the component 16 as the ultrasonic transducer, and is on an opposite side of the component from the ferromagnetic device 24. The magnetic source of the embodiment of FIG. 1, which comprises a first electromagnet 20 that is a first distance from a first side 30 of the ultrasonic transducer 12 and a second electromagnet 22 that is a second distance from a second side 32 of the ultrasonic transducer, may be advantageously configured such that the first and second distances are equivalent. The distances may be measured in any direction from any relative reference points, so long as the reference points are commensurate for both electromagnets 20 and 22. By providing electromagnets 20 and 22 that are equally spaced from the ultrasonic transducer 12, and particularly the ultrasonic horn 14, the ultrasonic welding apparatus of the present invention provides a magnetic field with a midplane that coincides with the center of the ultrasonic transducer and ultrasonic horn. Accordingly, the pressure provided by the ferromagnetic device will advantageously be centered on the ultrasonic horn to provide generally uniform pressure to the component during the joining process. Further embodiments of the present invention may provide alternative configurations with magnetic sources comprised of one or more magnets at various positions relative to the ultrasonic transducer, such that the magnetic field is centered or is not centered with respect to the ultrasonic transducer and ultrasonic horn.

The magnetic source of FIG. 1 comprises two electromagnets 20 and 22. The electromagnets advantageously provide an adjustable magnetic field, such that a change in the magnetic field changes the compressive force or pressure that the ferromagnetic device applies to the component. Accordingly, the present invention provides for precise application of compressive forces on the component being joined. However, further embodiments of the present invention comprise magnetic sources that provide a constant magnetic field, such as by one or more permanent magnets. Examples of permanent magnets that may comprise the magnetic source include, but are not limited to, standard ceramic magnets, ferrite magnets, or magnets formed of neodymium iron boron, samarium cobalt, or alnico. The magnetic source may also provide adjustable magnetic fields by alternative devices, such as rare earth metal switched devices, as disclosed in U.S. Pat. No. 6,180,928, which is assigned to the present assignee, to list one non-limiting example. Still further embodiments of the present invention comprise alternative magnetic sources.

The ferromagnetic device 24 of FIG. 1 is a magnet that defines a generally spherical outer surface. The ferromagnetic device of further embodiments of the present invention may comprise any ferromagnetic material, such as steel or other metals, to list non-limiting examples, but is advantageously a magnet to provide a relatively strong magnetic coupling between the magnetic source and ferromagnetic device, which further provides a relatively strong compressive force on the composite positioned therebetween. The ferromagnetic device 24 of FIG. 1 is advantageously a permanent magnet, such as a standard ceramic or ferrite magnet or a magnet formed of neodymium iron boron, samarium cobalt, or alnico, to list non-limiting examples. The ferromagnetic device 24 of the illustrated embodiment also defines a generally spherical outer surface so that the ferromagnetic device may rotate as the component is moved relative to the ultrasonic transducer 12 and/or the magnetic source 20 and 22, such that the ferromagnetic device remains in a generally fixed position relative to a moving component during the joining process. For the component 16 of FIG. 1, the rolled sheet of thermoplastic is advanced axially (into or out of the page) to define the joint 18 along a generally axial direction. By providing a ferromagnetic device 24 that is generally spherical, the ferromagnetic device may roll along the inside surface of the rolled sheet to remain in the generally fixed position relative to the moving component so that the ferromagnetic device maintains a generally consistent compressive force on the component at a generally consistent location, relative to the ultrasonic transducer 12 and horn 14.

It should be appreciated that the ferromagnetic device of further embodiments of the present invention may define alternative shapes. The shape of the ferromagnetic device may be customized to suit the particular application for which it will be used. For example, if at least one component is being joined to itself or another component in such a way that a spherical ferromagnetic device would not provide or maintain compressive force in the desired direction because of the shape of the joint, such as in a lap joint, to list one non-limiting example, the ferromagnetic device may define a shape that conforms more closely to the intended joint configuration. Non-limiting examples of alternative ferromagnetic devices include ferromagnetic devices defining a generally cylindrical outer surface to accommodate a relatively wide joint or a stepped cylindrical outer surface to accommodate a step in at least one component being joined. Furthermore, the diameter or other dimension of the ferromagnetic device may be customized for the particular application.

As previously described, the component 16 of FIG. 1 is a thermoplastic sheet that has been rolled prior to engaging the ultrasonic welding apparatus 10. Fixturing (not shown) is advantageously provided to maintain the generally cylindrical shape of the component 16 prior to the joining process because the component 16 typically has been elastically deformed and thus will generally return to its un-rolled shape if not restrained. The component 16 of FIG. 1 is shown in an axial cross-section as the component is being axially advanced relative to the ultrasonic welding apparatus 10. The joining process creates the joint 18 along opposed edges of the component to permanently join the edges and define a generally circular axial cross-section. Components of alternative material or shape, or combinations of components of differing materials and shapes may be joined using the ultrasonic welding apparatus.

To ultrasonically join at least one component with the ultrasonic welding apparatus of the present invention, the component 16 is positioned adjacent the ultrasonic transducer 12, such that the ultrasonic transducer and the magnetic source 20 and 22 are on a common side of the component, as representatively shown in FIG. 1. Advantageously, the component 16 is positioned such that the portion of the component to be joined, such as the opposed edges of the component of FIG. 1, engage the ultrasonic horn 14 of the ultrasonic transducer 12. Additionally, the component may also engage the magnetic source 20 and 22, as also shown in FIG. 1. Once the component 16 has been generally positioned adjacent the ultrasonic transducer 12 and magnetic source 20 and 22, the ferromagnetic device 24 is provided on a side of the component that is opposite the ultrasonic transducer and the magnetic source, such that the component is positioned between the ultrasonic transducer and ferromagnetic device. Typically, an operator provides the ferromagnetic device 24 at the appropriate location manually; however, an automated system may alternatively provide the ferromagnetic device at the predetermined location and time as required.

Once the ferromagnetic device 24 has been positioned and the magnetic source 20 and 22 activated so as to produce the magnetic field, the ferromagnetic device advantageously is supported entirely by the magnetic field such that arms and other fixturing are not required to maintain the position of the ferromagnetic device during the joining process. The ferromagnetic device 24 is magnetically attracted to the magnetic source 20 and 22, which is located on an opposite side of the component 16.

Accordingly, the ferromagnetic device 24 applies a compressive force on the component 16 because the component is restraining the ferromagnetic device from moving to the magnetic source. Moreover, the engagement of the component by the ultrasonic horn prevents movement of the component in response to the application of compressive force by the ferromagnetic device, thereby trapping the component therebetween so as to be subject to the compressive force. The amount of compressive force the ferromagnetic device 24 applies is directly related to the intensity of the magnetic field applied by the magnetic source, the magnetic properties of the ferromagnetic device, the mass of the ferromagnetic device, and other parameters or properties of the magnetic source and ferromagnetic device.

To join the component 16, the ultrasonic transducer 12 transmits an ultrasonic signal through the ultrasonic horn 14, and the mechanical vibrations induced by the ultrasonic signal causes the material of the component proximate the ultrasonic transducer to soften or melt. The pressure of the compressive force applied by the ferromagnetic device 24 causes the softened or melted material to deform according to the amount and direction of the compressive force. The component 16 is axially advanced, relative to the ultrasonic transducer, at a particular speed that depends upon the component material, the intensity of the mechanical vibrations, and other parameters or properties of the ultrasonic welding apparatus and component. As the component 16 is axially advanced, the softened or melted material that has been joined hardens to form the joint 18. After the component has been joined along the desired axial length of the component 16 and the ultrasonic transducer 12 is powered off, the ferromagnetic device 24 may be removed from the component before the component is disengaged from the ultrasonic device 12 or after the component has been disengaged. When the magnetic source 20 and 22 comprises an electromagnet, as in FIG. 1, the applied magnetic field is advantageously reduced or deactivated to facilitate the removal of the ferromagnetic device. Alternatively, when the magnetic source comprises a permanent magnet, separation of the ferromagnetic device will require a force greater than the attractive force provided by the permanent magnet. Further embodiments of the present invention may comprise alternative techniques for positioning the ultrasonic transducer, magnetic source, and/or ferromagnetic device and for positioning the component, particularly when two or more components are being joined.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An ultrasonic welding apparatus for joining at least one component, the ultrasonic welding apparatus comprising:
   an ultrasonic transducer adjacent the component;
   a magnetic source providing a magnetic field, wherein the magnetic source is proximate the ultrasonic transducer, and a ferromagnetic device opposite the component from the magnetic source and the ultrasonic transducer, wherein the ferromagnetic device defines a generally spherical outer surface;

wherein the magnetic field of the magnetic source supports the ferromagnetic device so that the component is positioned between the ultrasonic transducer and the ferromagnetic device.

2. An ultrasonic welding apparatus according to claim 1 wherein the ferromagnetic device comprises a steel sphere.

3. An ultrasonic welding apparatus according to claim 1 wherein the ferromagnetic device comprises a magnet.

4. An ultrasonic welding apparatus according to claim 1 wherein the magnetic source provides an adjustable magnetic field, such that a change in the magnetic field of the magnetic source changes a compressive force the ferromagnetic device applies to the component.

5. Au ultrasonic welding apparatus according to claim 4 wherein the magnetic source comprises an electromagnet.

6. An ultrasonic welding apparatus according to claim 1 wherein the ultrasonic transducer defines a first side and a second side opposite the first side, and wherein the magnetic source comprises a first electromagnet proximate the first side of the ultrasonic transducer and a second electromagnet proximate the second side of the ultrasonic transducer, such that the first and second electromagnets are located an equivalent distance from the respective sides of the ultrasonic transducer.

7. An ultrasonic welding apparatus according to claim 1 wherein the ultrasonic transducer comprises an ultrasonic horn located between the ultrasonic transducer and the component.

8. An ultrasonic welding apparatus according to claim 7 wherein the component engages the magnetic source and the ultrasonic horn during the joining of the component.

9. A method of ultrasonically joining at least one component, comprising the steps of:

positioning the component to be adjacent to an ultrasonic transducer such that the ultrasonic transducer and a magnetic source are on a common side of the component;

providing a ferromagnetic device on a side of the component opposite the ultrasonic transducer and the magnetic source, wherein the ferromagnetic device defines a generally spherical outer surface;

applying a magnetic field from the magnetic source, such that magnetic field of the magnetic source supports the ferromagnetic device so that the component is positioned between the ultrasonic transducer and the ferromagnetic device; and transmitting an ultrasonic signal from the ultrasonic transducer to join the component.

10. A method according to claim 9 wherein providing a ferromagnetic device comprises providing a steel sphere.

11. A method according to claim 9 wherein providing a ferromagnetic device comprises providing a magnet that defines a generally spherical surface.

12. A method according to claim 9 wherein applying a magnetic field comprises generating an adjustable magnetic field, such that a change in the magnetic field of the magnetic source changes a compressive force the ferromagnetic device applies the component.

13. A method according to claim 12 wherein applying a magnetic field comprises generating the adjustable magnetic field from an electromagnet.

14. A method according to claim 9 wherein positioning the component comprises providing the ultrasonic transducer between a first electromagnet proximate a first side of the ultrasonic transducer and a second electromagnet proximate a second side of the ultrasonic transducer, such that the first and second electromagnets are located an equivalent distance from the respective sides of the ultrasonic transducer.

15. A method according to claim 9 wherein positioning the component comprises positioning the component such that the component engages an ultrasonic horn of the ultrasonic transducer and engages the magnetic source.

16. A method according to claim 9, further comprising the step of advancing the component relative to the ultrasonic transducer as the ultrasonic transducer transmits the ultrasonic signal to define a joint along the component.

* * * * *

UNITED STATES PATENT AND TRADEMARK OFFICE
CERTIFICATE OF CORRECTION

| | | |
|---|---|---|
| PATENT NO. | : 7,152,775 B2 | Page 1 of 1 |
| APPLICATION NO. | : 10/827077 | |
| DATED | : December 26, 2006 | |
| INVENTOR(S) | : Jackson et al. | |

It is certified that error appears in the above-identified patent and that said Letters Patent is hereby corrected as shown below:

Column 1,

Lines 40 and 45, "an" should read --arm--;

Line 47, "die" should read --the--.

Signed and Sealed this

Tenth Day of April, 2007

JON W. DUDAS
*Director of the United States Patent and Trademark Office*